(12) United States Patent
Godel et al.

(10) Patent No.: US 6,448,667 B2
(45) Date of Patent: Sep. 10, 2002

(54) DRIVE DEVICE

(75) Inventors: Martin Godel, Owen/Teck; Markus Hoffmann, Wolfschlugen, both of (DE)

(73) Assignee: Festo AG & Co., Esslingen (DE)

( * ) Notice: Subject to any disclaimer, the term of this patent is extended or adjusted under 35 U.S.C. 154(b) by 30 days.

(21) Appl. No.: 09/785,586

(22) Filed: Feb. 16, 2001

(30) Foreign Application Priority Data

Mar. 1, 2000 (DE) .......................................... 100 09 862

(51) Int. Cl.⁷ ................................................ B60K 25/00
(52) U.S. Cl. ........................................ 290/1 R; 74/89
(58) Field of Search ................................ 290/1 R, 1 C, 290/3, 4 C; 74/89, 128, 130

(56) References Cited

U.S. PATENT DOCUMENTS 4,925,199 A * 5/1990 Hirmann ..................... 280/216
5,836,205 A * 11/1998 Meyer ......................... 74/422
5,950,790 A * 9/1999 Barber ........................ 192/139
6,070,485 A * 6/2000 Funk et al. ................... 74/335
6,178,836 B1 * 1/2001 Miyake et al. ................ 476/64
6,213,681 B1 * 4/2001 Sick et al. ................... 366/116

* cited by examiner

Primary Examiner—Nicholas Ponomarenko
(74) Attorney, Agent, or Firm—Hoffmann & Baron, LLP

(57) ABSTRACT

A drive device comprising at least one drive unit having two mutually spaced apart pressing bodies. On the pressing bodies mutual facing pressing faces are provided diverging in a drive direction and having between them a stroke unit engaging the pressing faces of both pressing bodies. Furthermore drive means are present by means of which a drawing together of the pressing bodies may be caused and, as a result of this a displacement of the stroke unit in the drive direction along the pressing faces for the purpose of producing a drive movement able to be externally employed.

22 Claims, 3 Drawing Sheets

DRIVE DEVICE

BACKGROUND OF THE INVENTION

The invention relates to a drive device or transmission, which may for example be employed in the pneumatic equipment sector as a valve drive.

THE PRIOR ART

In connection with valves serving for the control of fluid flows in the pneumatic equipment sector so far as a rule valve drives have been utilized, which are constituted by electromagnets or piezoelectric transducers. While being suitable for the transmission of large forces such drives generally only perform a drive movement with relatively small force strokes. Furthermore, there are design limitations as regards presetting the force-stroke characteristic, this restricting the field of application.

SHORT SUMMARY OF THE INVENTION

One object of the invention is to create a drive device whose characteristics are able to be varied using comparatively simple means and which in case of need renders possible performing drive movements with a large force and simultaneously a large stroke.

In order to achieve these and/or other objects appearing from the present specification, claims and drawings, the present invention provides at least one drive unit, which comprises two mutually spaced pressing bodies on which facing pressing faces are provided, which diverge in a drive direction and between which a stroke unit is located engaging the pressing faces of the two pressing bodies, and furthermore drive means for causing a mutual motion together of the pressing bodies and a displacement, resulting therefrom of the stroke unit in the drive direction along the pressing faces for the production of a drive movement which can be utilized externally.

The drive device thus comprises at least one drive unit, which possesses a stroke unit, which is arranged between the pressing faces, which are moving apart, of two spaced pressing bodies. By way of drive means cooperating with one or both pressing bodies it is possible for the pressing bodies to be so moved in relation to one another that the pressing faces draw closer together. Owing to their diverging configuration this results in a displacement of the stroke unit in a direction athwart the direction of movement together of the pressing faces, the direction of displacement being termed the drive direction. The stroke unit is practically displaced out of the way by the pressing faces acting on it, there being a redirecting of the force in the said drive direction. The displacement of the stroke unit may then be utilized externally as a drive movement, which acts directly or indirectly on a component to be moved, as for example on the valve member to be actuated of a control valve.

Because the configuration of the pressing faces can be preset in a predetermined manner by the manufacturer, drive devices with a customized adaptation of the force-stroke characteristic may be produced in a relatively simple fashion. Inherently means may be employed as a drive which produces only a small stroke but a high actuating force, the design of the pressing faces being able to be configured to yield a transmission ratio, which converts a relatively small stroke of the drive means into a sufficiently large stroke of the drive movement able to be employed as an output. It is for this reason that the drive device is particularly suitable for the production of small and miniature designs, a piezoelectric transducer device means being for example employed as a drive means. As an alternative it would be possible as well to use drive means operated by fluid power as are supplied by the assignee under the trade name of "Fluidic Muscles".

The drive device offers the further advantage that it may in case of need be so designed and operated that it provides for a constant drive characteristic and different stroke positions of the stroke unit may be set in a stepless manner.

Further advantageous developments of the invention are defined in the claims.

The two pressing bodies are preferably moved toward each other by activation of the drive means starting from a home position, the pressing face of at least one, and preferably both of the pressing bodies being so shaped that as considered in the home position, there is an inclination of the faces in relation to the drive direction produced.

In the simplest case the pressing faces present are in the form of oblique faces with a linear form. By presetting the angle of inclination in relation to the drive direction it is possible for the transmission ratio or, respectively, the force-stroke characteristic to be predetermined. In order to produce customized drive movements, the pressing faces may be also provided with a curved shape in order to produce a non-linear motion characteristic.

The drive device may in principle be so designed that the relative movement of the two pressing bodies is produced by the movement of only one pressing body, the other pressing body remaining stationary and for instance being fixedly attached to an associated housing part. However it is preferred to have a design which ensures simultaneous motion of the two pressing bodies during movement together.

The mutual movement together of the pressing faces is preferably produced by a pivoting movement of one or both pressing bodies. For this purpose the pressing bodies may be coupled together in a pivoting manner in relation to one another in a bearing zone and extend approximately in the same direction away from the bearing zone, and furthermore delimit a pressing space wherein the moving stroke unit is located. The drive means are in this case preferably placed at the bearing zone, a pull and/or thrust action being provided in a manner dependent on the side of the application of the drive forces in order to cause a pivoting action of at least one pressing body.

It is particularly advantageous for a piezoelectric transducer means to be installed, which possesses at least two stack translators connected in parallel and rendering possible a simultaneous opposite operation so that on the one side of the pivot zone a pulling force is produced and on the other side at the same time a thrust force may be exerted on the pressing bodies. It would for instance be possible to utilize a piezoelectric transducer means as sold by the company "marco Systemanalyse und Entwicklung GmbH", of 85221 Dachau, Germany under the name of "Torque-Blocks".

In order to produce the return motion, opposite to the drive movement, of the stroke unit it is possible to use a passive spring means instead of an active actuating means. This spring means could act between the pressing bodies and/or engage the stroke unit.

Principally it would be feasible as well to design the stroke unit like a slide so that it could be displaced on the pressing faces as part of a sliding movement. In order to ensure a reliable manner of operation with minimum friction it is however preferred to utilize a stroke unit in the form of a rolling body unit, which during its drive movement rolls on the pressing faces of the pressing bodies. In order to prevent jamming in this connection the rolling body unit comprises more particularly at least two independently rotatable rolling bodies, which respectively engage only one of the pressing faces on the two pressing bodies so that the one rolling body may roll on the pressing face of the one pressing body and the other rolling body may roll on the pressing face of the other pressing body.

In the case of a further and more particularly advantageous embodiment of the invention the drive device is provided with two drive units, which are fitted together as an assembly, the pressing bodies of the two drive units being so fitted together in pairs as two flexurally rigid pressing elements that the pressing faces of the two drive units run apart from opposite sides which face away from the one another. Using a connecting yoke it is possible then for the two stroke units present to be so kinematically coupled that during a drive movement of the respectively one stroke unit the respectively other stroke unit is entrained and practically performs the return movement.

The two pressing elements are mounted in a bearing zone preferably in a relatively pivoting manner so that a rocking or see-saw movement of one or both pressing elements may be caused, always resulting in a movement together of the pressing faces and simultaneously a movement apart of the pressing faces of the other drive unit. In the case of a particularly economic design the drive units are arranged with bilateral symmetry with respect to the bearing zone.

The drive movement produced can be transmitted to other means from any point of the movement unit constituted by the stroke unit and the connecting yoke. It is more especially convenient however for such output drive movement to be taken from the connecting yoke and preferably in the area at the mid point the between the two stroke units.

In order to prevent jamming on shifting the movement unit it has turned out to be expedient to make the connecting yoke so resiliently elastic in its stroke direction that small relative movements of the two stroke units are possible in the direction of the motion produced. This means that inaccuracies in manufacture are compensated for.

Further advantageous developments and convenient forms of the invention will be understood from the following detailed descriptive disclosure of one embodiment thereof with possible modifications in conjunction with the accompanying drawings.

LIST OF THE SEVERAL VIEWS OF THE FIGURES

DETAILED ACCOUNT OF WORKING EMBODIMENT OF THE INVENTION

Figure 1:
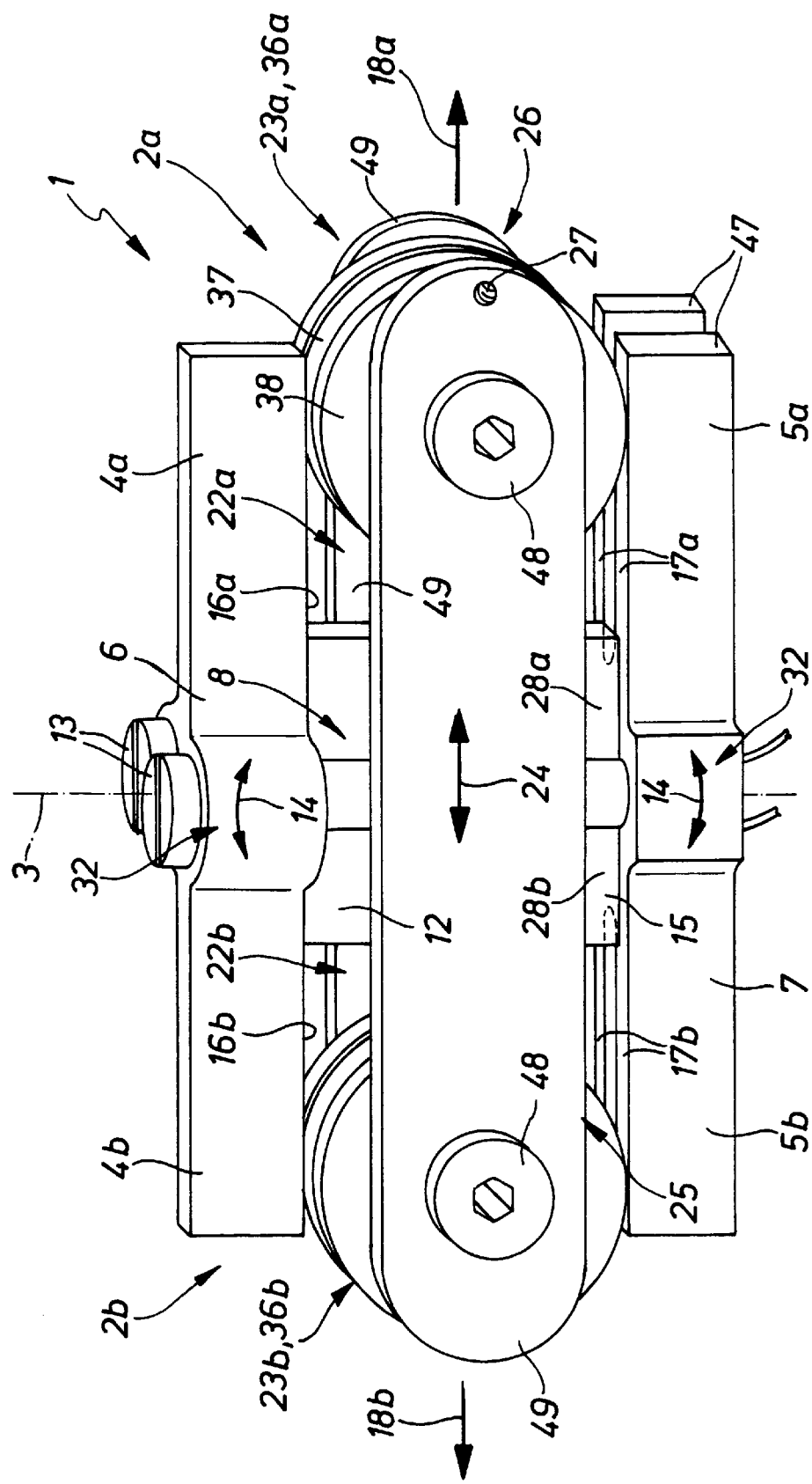
FIG. 1 shows a preferred embodiment of the drive device of the invention in a perspective elevation.
Figure 2:
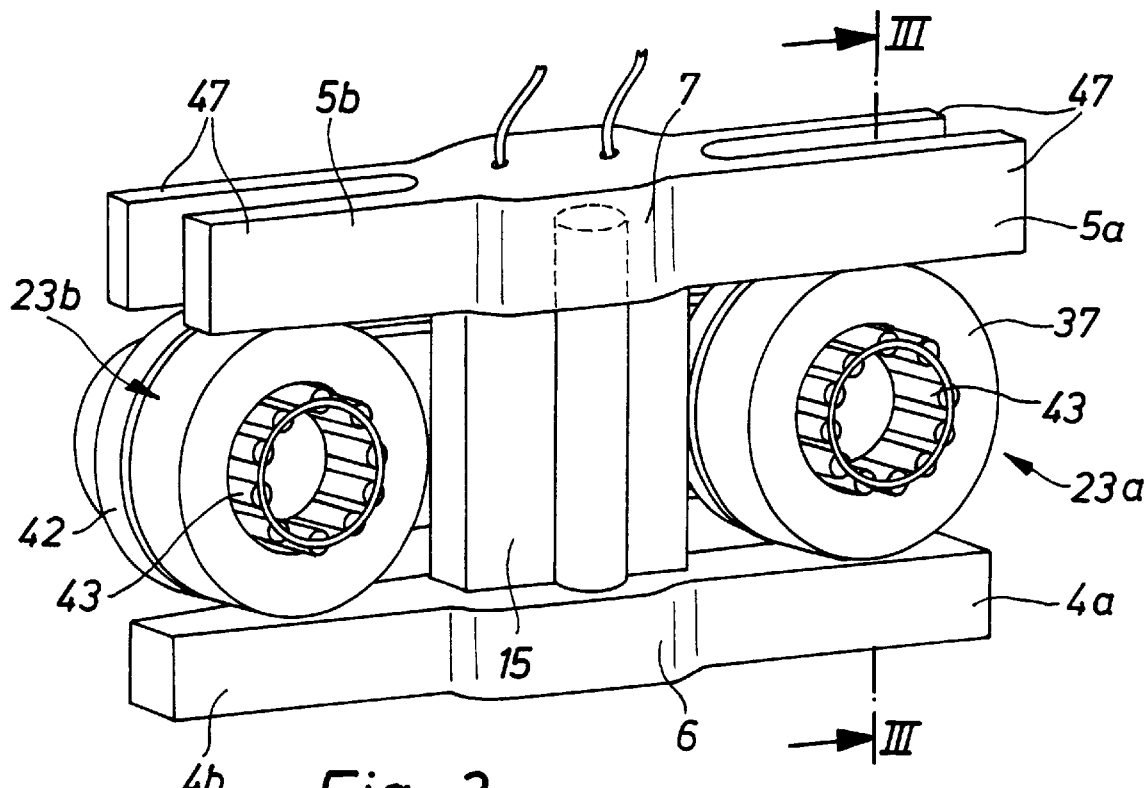
FIG. 2 shows device of FIG. 1 in an inverted position, the part of the connecting yoke present to the fore and parts of the stroke units being omitted in order to render the drawing more straightforward.

The drive device 1 illustrated in the drawings comprises two drive units 2a and 2b integrated as a single assembly, which possesses bilateral symmetry with respect to a plane containing a center axis 3.

Each drive unit 2a and 2b comprises an elongated flexurally stiff and preferably beam-like first pressing body 4a and 4b opposite which at a distance there is a second respective pressing body 5a and 5b. The first pressing bodies 4a and 4b are components of a rigid elongated first pressing element 6, and the second pressing bodies 5a and 5b are joined together as a similar second pressing element 7.

The two pressing elements 6 and 7 are pivotally mounted in a bearing zone 8 (for pivoting motion in relation to one another) in a plane containing the respective pressing elements 6 and 7. The possible pivotal movements are indicated by double arrows 14. The bearing zone is located adjacent to the center axis 3.

The two pressing elements 6 and 7 are clamped together using attachment elements 13 with a spacer member 12 in between. In the case of the attachment elements 13 it may, as illustrated, be a question of attachment screws, which extend through the pressing element 6, run past on either side of the spacer member 12 and are screwed into the second pressing element 7.

In the case of the member 12 it is a question here of electrically operated drive means 15, which are able to drive the two pressing elements 5 to perform the pivoting movement 14. They are biased by the pressing elements 6 and 7 and the attachment elements 13 acting on same. As related to the bearing zone 8 a respective rocking or see-saw movement of the pressing elements 6 and 7 is possible so that the elements 6 and 7 can be termed rocking elements. The angle of pivot is extremely small and may more particularly be permitted by the elasticity of the pressing elements 6 and 7 and/or of the attachment elements 13.

On the mutually facing sides of each first 4a and 4b and second 5a and 5b pressing body respectively facing first pressing faces 16a and 16b and second pressing faces 17a and 17b are provided. They are so designed that within a respective drive unit 2a and 2b a diverging configuration of the mutually opposite first and second pressing faces 16a, 17a; 16b and 17b results in a drive direction 18a and 18b extending away from the bearing zone 8. The respective pressing faces hence extend toward the free end of the respective pressing element 6 and 7 in a diverging manner, as is indicated clearly in FIG. 5, where the divergence is exaggerated.

The pressing bodies 4a, 5a; 4b and 5b, extending away from the bearing zone 8 in generally the same direction, of a respective drive unit 2a and 2b define between them a pressing space 22a and 22b, open toward on the outer side opposite to the bearing zone 8, in which space a respective stroke unit 23a and 23b is arranged. Each stroke unit 23a and 23b simultaneously abuts the first and the second pressing faces of the associated drive unit 2a and 2b. The contact does however render possible a relative movement of each stroke unit 23a and 23b while still maintaining contact, along the respectively associated pressing faces 16, 17a; 17a and 17b, the direction 24 of movement, in the following termed the "stroke direction" and indicated by a double arrow, extending in parallelism to the respective drive direction 18a and 18b.

Using an essentially rigid connecting yoke 25 the two stroke units 23a and 23b are coupled together in the stroke direction 24. The above mentioned components constitute a movement unit 26, which at all times is only able to be shifted together in a ganged manner in the stroke direction 24.

Figure 5:
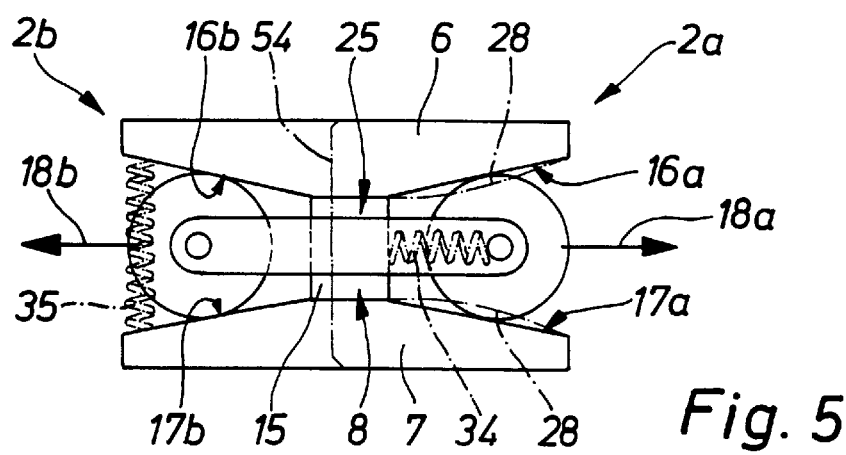
FIGS. 5 and 6 show in a diagrammatic elevation various operational phases of the drive, some possible modifications being indicated in chained lines as might be adopted in alternative designs of the invention.
Figure 6:
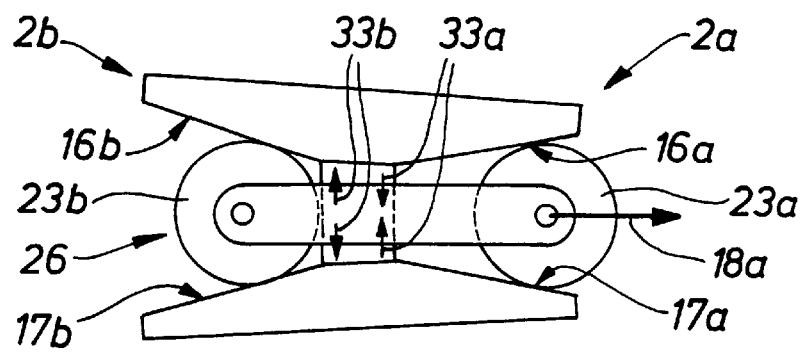

When the drive means 15 is not actuated the pressing bodies 4a, 4b: 5a and 5b assume a home position, which may be identical to the position indicated in FIG. 5. If the drive means 15 are actuated, they will in the case of one of the drive units cause a mutual movement together of the respective pressing bodies and thus of the pressing faces as well, as is indicated in FIG. 6. Here a condition is illustrated in the case of which the first and the second pressing faces 16a and 17a of the first drive unit 2a have moved together each other, something which owing to the above mentioned pivoting caused by the rocking movement results in the first and the second pressing faces 16b and 17b of the second drive unit 2b moving farther apart.

The drive means 15 may be so actuated that as regards the increase and the reduction of the mutually opposite pressing faces of the two drive units 2a and 2b a state is reached which is just the reverse of the that of FIG. 6.

Owing to the drawing together of the pressing faces there will be, because of the diverging configuration of the faces in the home position, a displacement of the associated stroke unit 23a and 23b in the respective drive direction 18a and 18b, the stroke unit running on the associated pressing faces. Dependent on the direction of pivoting of the pressing elements 6 and 7 therefore the one or other stroke unit 23a and 23b is forced outward. The corresponding movement of the stroke unit, in the case of which it is preferably a question of a strictly linear movement, can be transmitted to drive any desired external means or, respectively, any component for power output.

Since the stroke units 23a and 23b are joined together by way of the connecting yoke 25 as a moving unit 26, on forcing one respective stroke unit out of the way the other stroke unit will be simultaneously entrained and shifted into the interior of the associated pressing space 22 toward the bearing zone 8. Since the pressing faces of the two drive units 2a and 2b are identical in design, it is possible to ensure reliable operation without trouble conditions.

The drive movement produced may be transmitted from any suitable point on the movement unit 26. However, transmission from the connecting yoke 25 is recommended, which for this purpose may have a suitable force coupling means 27 (f. i. an attachment means) rendering possible the attachment of a component to be moved.

It is particularly preferred to transmit force from the median region of the connecting yoke 25 between the two spaced stroke units 23a and 23b.

By suitable selection of the configuration of the pressing faces 16 and 17—when reference is made to identical components of the two drive units 2a and 2b, this will be with the omission of the index letter "a" and "b"—the operating characteristics of the drive device 1 may be customized for the user. There is more particularly the possibility of an optimum adaptation of the force-stroke characteristic of the drive movement which is transmitted, to suit each individual case in the best possible way.

It would for example be possible—considering the home position in accordance with FIG. 5—provide respectively only one pressing face on a respective drive unit 2a and 2b with an inclined configuration in relation to the resulting drive direction 18a and 18b. It has turned out however that an improved movement characteristic results when both pressing faces 16a, 17a; 16b and 17b of a respective drive unit 2a and 2b have an oblique configuration, it being preferred for there to be identical angles of inclination in relation to the desired stroke direction 24.

There is furthermore the possibility of so designing that the face configuration of the pressing faces in the respectively associated drive direction 18a and 18b, that is to say toward the free end of a respective pressing element 6 and 7, is not linear as in the drawings, but curved with an arcuate or curved shape, as is indicated in FIG. 5 at 28 in chained lines.

Dependent on how the drive device 1 is held during use—it is preferred for it to be accommodate in a housing not illustrated in detail—it is possible on actuation of the drive means 15 for either both pressing elements 6 and 7 to be actuated simultaneously or only of them to perform a movement.

The drive device 1 of the embodiment of the invention is characterized by the possibility of being produced with a particularly small size. This is associated with the fact that as a drive means 15 a piezoelectric transducer means is employed, which may be optimally adapted to the intermediate space between the two pressing elements 6 and 7.

The piezoelectric transducer means preferably has a stack translator design, there being in the working example two adjacently placed stack translator units 28a and 28b, which however may be integrated with each other as a single assembly. The two stack translator units 28a and 28b are so arranged that they engage the pressing elements on either side of the center 32 of pivot of a respective pressing element 6 and 7. As related to the region of the center 32 of pivoting the one stack translator unit 28a is on the side facing the one stroke unit 28a and the other stack translator unit 28b is on the side facing the other stroke unit 23b.

By means of the attachment elements 13 the pressing elements 6 and 7 are thrust with a certain biasing effect from opposite sides against the two stack translator units 28a and 28b. During operation the two stack translator units 28a and 28b are connected in parallel and they are operated in the opposite direction simultaneously so that one stack translator unit is shortened and the other one is extended in length. The stack translator unit which is extended in length thrusts against the associated pressing bodies so that same are spread apart and acting as a two-armed (second class) lever cause a pivoting movement 14 accompanied by a mutual movement together of the pressing bodies of the other drive unit. Since the other stack translator unit is shortened at the same time, it does not hinder the movement together of the associated pressing bodies. It is even possible to provide a connection able to resist pulling forces, between the stack translator units and the pressing bodies, which will ensure that the pressing bodies are additionally actively drawn together by the shortening of the stack translator unit.

As a piezoelectric transducer means it would for instance be possible to utilize a piezoelectric transducer means as sold by the company "marco Systemanalyse und Entwicklung GmbH", of 85221 Dachau, Germany under the name of "Torque-Blocks". It is a question here practically of an active rotary joint with the faces center as an axis of rotation. The angles of rocking and the rigidity are selected more particularly by varying the length, thickness the width of the block as may be desired.

It is more particularly in the case of designs with a large overall volume that instead of electrical drive means the use of fluid driven drive means could come into question, as for instance linear motors or traction elements designed like hoses or flexible tubes which shorten when pressurized. Such drives are sold by the assignee under the trade name of "Fluidic Muscles" and are for instance described in the European patent publication 0 161 750 B1 so that a more detailed description is not necessary at this point.

In FIG. 6 arrows 33a and 33b again indicate the pulling or traction and thrust direction of the drive means, when the movement unit 26 is to be shifted in the first drive direction 18a.

The drive device 1 of the embodiment of the invention offers the advantage that drive movements may be produced in two opposite drive directions 18a and 18b may be produced by active drive means 15 in connection with the application of external energy and force may be supplied by the device. However it would also be feasible to provide the return movement opposite to a drive movement by passive drive means, a spring means being more particularly considered as is indicate FIG. 5 in chained lines at 34. It is able to return the movement unit 26 after deactivation of the drive means 15 from the displaced position into the starting position, the contact with the associated pressing faces ensuring simultaneous return of the pressing elements 6 and 7 into the home position.

As an alternative or in addition to a spring means, which operates between the movement unit 26 and at least one pressing body, it would also be possible to employ a further spring means 35, which is again indicated in FIG. 5 in chained lines, such means being effective between the two spaced pressing bodies of the one of the drive units.

It would in principle be possible to design the stroke units 23a and 23b as sliding units, which during the drive movement slide on the associated pressing faces 16 and 17. Preferably however a design in the form of rolling body units 36a and 36b is employed, which is substantially better as regards frictional resistance, such design being used in the embodiment of the invention. The rolling body units 36a and 36b roll along the associated pressing faces in the course of the drive movement.

In order to prevent jamming or locking the rolling body units 36 possess two coaxially aligned rolling bodies 37 and 38 which are able to be rotated independently and which engage only one of the pressing faces 16 and 17 of the two associated pressing bodies 4 and 5. Thus while one rolling body cooperates exclusively with the one pressing face 16, the other rolling body 38 cooperates exclusively with the other pressing face 17 so that during the drive movement there will be an opposite rotary movement of the two rolling bodies 37 and 38 of a respective rolling body unit 36.

Figure 3:
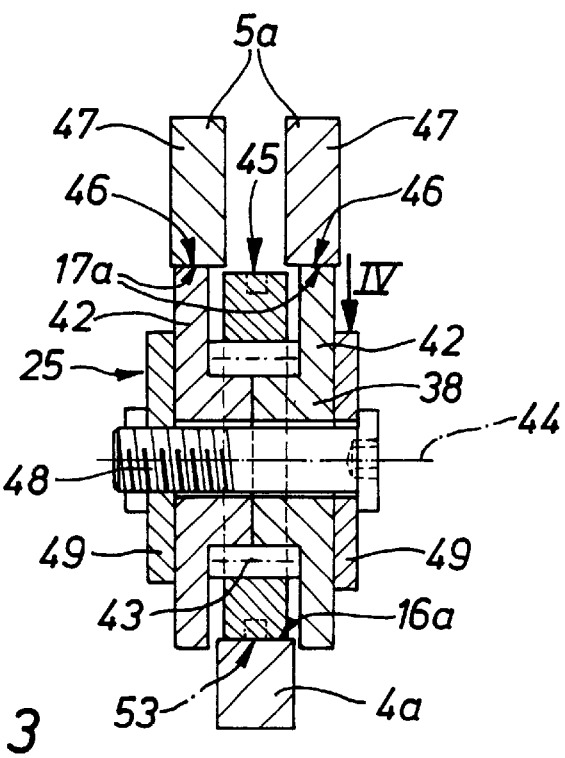
FIG. 3 is a cross section taken through the drive device on the section line III—III of FIG. 2.

A preferred design is more particularly clearly depicted in the sectional view of FIG. 3. Here there is a rolling-like or wheel-like inner rolling body 37, which is flanked axially on either side by two parts 42 of an external rolling body 38. Ignoring the division of the outer rolling body 38, same will be seen to have a H-like cross section, the inner rolling body 37 being seated coaxially on the connecting rib or web of the letter H. Owing to the division the fitting of the inner rolling body 37 is rendered possible, the two parts 42 preferably being identical in form.

Between the two rolling bodies 37 and 38 there is a coaxially placed bearing means 43, preferably constituted by a rolling element or anti-friction bearing means, f. i. in the form of a bearing sleeve, radially holding the two rolling bodies 37 and 38 in relation to one another and which simultaneously ensures free relative rotation of the two rolling bodies 37 and 38. The axis of rotation 44 coincides with the longitudinal axis of the rolling bodies 37 and 38.

An outwardly facing first running face 45 of the inner rolling body 37 is in constant rolling engagement with the first pressing face 16 of the first pressing body 4. The second running face 46, cooperating with the second pressing body 5, of the outer rolling body 38 is divided up into face sections at the two rolling body parts 42, such face sections accordingly cooperating with a second pressing face 17, such second face being laterally offset in relation to the first pressing face 16 in the direction of the axis 44 of rotation, the face 17, which in this case engage the arms 47 (which are parallel to each other) of the second pressing body 5. These arms are laterally spaced apart so that a collision with the inner intermediately placed rolling body 37 is avoided. The second pressing face is accordingly also divided up into spaced apart face sections.

Connecting means 48, f. i. connecting screws, hold each respective rolling body unit 36 together and preferably serve at the same time to fix the connecting yoke 25. In the working embodiment illustrated this yoke comprises two mutually parallel strut-, rail- or rod-like connecting elements 49, which extend from the two axial outer sides and are mounted on the respective stroke unit 23 and extend between the two stroke units. They extend externally past the drive means 15 and attachment elements 13 arranged adjacent to the bearing zone 8.

Figure 4:
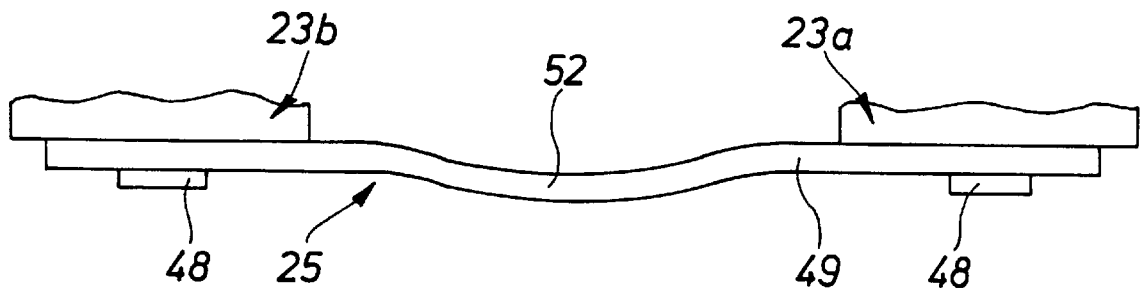
FIG. 4 is a plan view of the resiliently elastic component of the connecting yoke looking in the direction of the arrow IV of FIG. 3.

Investigations have shown that even in an ideal case and with an identical design of the pressing faces 16 and 17 the strokes of the stroke units 23 differ. In order to compensate for this the connecting yoke is preferably made so resiliently elastic in its stroke direction that small relative movements of the two stroke units 23 are possible in the stroke direction 24. In the working embodiment illustrated this is made possible because of a slightly curved form of the connecting elements 49 consisting of resiliently elastic material, such curved form coinciding with the stroke direction 45, one of such connecting elements being depicted in FIG. 4. It will be clear that the deformation region 52, which renders possible a certain elastic deformation, could be produced by other configurations of the connecting yoke 25. In any case the elastic design of the connecting yoke 25 does offer the advantage of allowing for inaccuracies in manufacture and thus countering any accidental jamming of the moving components.

In order to ensure that the stroke units 23 exactly follow the associated pressing faces 16 and 17 during their displacement additional guide means 53 may be provided in case of need. Such means preferably act between a respective stroke unit 23 and at least one associated pressing body 4 and 5. In the working embodiment illustrated the guide means 53 take effect between the inner rolling body 37 and the associated first pressing body 4 because at least one annular groove is formed in the first running face 45, into which groove a longitudinal projection provided on the first pressing face 16 fits. This arrangement may also be reversed with the groove and the projection in and on the respectively other parts.

While the drive device 1 of the working example possesses two drive units 2a and 2b, it would naturally be possible as well to design the device 1 with only one drive unit. As related to the diagrammatic view of FIG. 5 then for example the second drive unit 2b would be left out and the first drive unit 2a would terminate at the chained line 54 adjacent to bearing zone 8. The two pressing bodies 4a and 4b could here, together with the bearing zone 8, form a generally U-like configuration, the single stroke unit 23a being returned, after causing the drive movement, by a spring means 34 into the starting position. In other respects the explanations so far on the drive device 1 would apply as regards the drive device provided with only one drive unit.

By way of conclusion there will now follow a general explanation of the preferred design and manner of operation of the drive device. As we have seen the drive means 15 may be constituted by a piezoelectric flexural actuator, which on operation undergoes deflection through an angle of bend. The torque produced by this actuator is transmitted to the flexurally rigid, beam-like pressing elements 6 and 7, whose inner faces open or diverge obliquely outwardly so that a sort of scissors is formed. If the flexural actuator is now deflected in one direction, on the one side there will be an increase of the angles defined by the inner faces and, respectively, the pressing faces 16 and 17 and on the other side a decrease. A rolling system 36 employed here, which is connected by the connecting yoke 25, consequently performs a linear movement at a right angle to the longitudinal extent of the drive means 15 and, respectively, to the middle axis 3. Then the rolling body unit of the closing scissors will be actively driven. Owing to the design of the rolling body unit with an inner wheel and a two-part outer wheel, which are connected together by way of a bearing means 43, jamming of the system is prevented.

In the case of depicted "double scissors drive" the connecting yoke 25 should be made elastic in the case of a straight, oblique arrangement of the pressing faces 16 and 17, since the two rolling body units 36 moved in relation to one another on alternate opening of the drive units, something which, if there is no possibility of compensation, might result in jamming of the drive. An elastic connecting yoke 25 is furthermore also advantageous in order to ensure play-free engagement of the rolling bodies 37 and 38 with the pressing faces 16 and 17. In order to prevent relative motion of the second rolling body units 36, it would however be possible to provide specially designed pressing faces 16 and 17, which would not be straight but curved.

The drive device may be designed as a "double scissors drive" with two drive units or also as a "single scissors drive" functioning with a single spring and having only one drive unit.

The drive device may be manufactured to be compact and simple. Furthermore, the force-stroke ratio may be selected freely selected in limits and essentially depends of the angle of inclination of the pressing faces 16 and 17. In the case of use of a piezoelectric transducer as a drive means it is accordingly possible to produce a drive system having a lower power requirement and capable of continuously operating, which for instance may be utilized for the drive of valves.

What is claimed is:

1. A drive device comprising at least one drive unit with two mutually spaced pressing bodies on which facing pressing faces are provided, which diverge in a drive direction and between which a stroke unit is located engaging the pressing faces of the two pressing bodies, and furthermore drive means for causing a mutual motion together of the pressing bodies and a displacement, resulting therefrom of the stroke unit in the drive direction along the pressing faces for the production of a drive movement which can be utilized externally.

2. The drive device as set forth in claim 1, wherein the pressing faces of both pressing bodies, as considered in a spaced apart home position, have an inclined form as related to the drive direction.

3. The drive device as set forth in claim 1, wherein the pressing face of at least one pressing body possess a straight or curved form in the drive direction.

4. The drive device as set forth in claim 1, wherein the pressing bodies are so designed that during mutual movement of the pressing faces toward each other, both pressing bodies move.

5. The drive device as set forth in claim 1, wherein the mutual movement together, able to be caused by the drive means, of the pressing faces is produced by a forced pivotal motion of at least one pressing body.

6. The drive device as set forth in claim 1, wherein the two pressing bodies are coupled together in a pivoting manner in relation to each other in a bearing zone, extend generally in the same direction from the bearing zone and delimit a pressing space which at least partially receives the stroke unit, said space being preferably open on the outer end opposite to the bearing zone.

7. The drive device as set forth in claim 5, wherein for causing movement together of the pressing faces using drive means placed between the pressing bodies pulling and/or thrust forces may be exerted on the pressing bodies, the application of such pulling forces being on the face facing the pressing faces and the application of the thrust forces being on the side facing away from the pressing faces of the center of pivoting, of the at least one pressing body.

8. The drive device as set forth in claim 7, wherein the two pressing bodies are coupled together in a pivoting manner in relation to each other in a bearing zone, extend generally in the same direction from the bearing zone and delimit a pressing space which at least partially receives the stroke unit, said space being preferably open on the outer end opposite to the bearing zone and wherein means are provided at the bearing zone.

9. The drive device as set forth in claim 1, wherein at least the mutual movement together and preferably also the opposite return movement of the two pressing bodies is produced by electrical drive means and/or by drive means operated by fluid power.

10. The drive device as set forth in claim 9, comprising electrically operated drive means in the form of a piezoelectric transducer means.

11. The drive device as set forth in claim 10, wherein the piezoelectric transducer means comprises one or more stack translator units.

12. The drive device as set forth in claim 11, comprising two stack translator units connected in parallel and able to be operated to produce preferably both pulling forces and also thrust forces simultaneously in opposite directions.

13. The drive device as set forth in claim 1, wherein said drive means comprise at least one spring means for causing the return movement opposite to the drive movement, of the stroke unit.

14. The drive device as set forth in claim 13, comprising at least one spring means adapted to act on at least one of said pressing bodies and/or on the stroke unit.

15. The drive device as set forth in claim 1, wherein said stroke unit is constituted by a rolling body unit adapted to roll on the pressing faces of the pressing bodies during the drive movement.

16. The drive device as set forth in claim 15, wherein the rolling body unit comprises at least two independently rotating and for example rolling-like rolling bodies, which respectively engage only one of the pressing faces of the two pressing bodies.

17. The drive device as set forth in claim 6, having a coaxial arrangement of the rolling bodies of the rolling body unit and an accordingly relatively laterally offset arrangement of the pressing faces.

18. The drive device as set forth in claim 1, comprising two drive units constituting an assembly, whose pressing bodies are so placed in pairs to form two flexurally rigid pressing elements that the pressing faces of the two drive units diverge toward oppositely facing, opposite sides and the stroke units thereof are so kinematically coupled for opposite motion that during drive movement of respectively one stroke unit the respectively other stroke unit is entrained therewith.

19. The drive device as set forth in claim 18, wherein the two pressing elements are so movingly mounted relative to each other in a bearing zone provided in the transition zone between the two drive units that at least one pressing element may be caused to perform rocking movements by the drive means, in the case of which the pressing faces move toward one another and at the same time the pressing faces of the other drive unit move apart.

20. The drive device as set forth in claim 18, wherein the connecting yoke is designed in the form of a member for the transmission of drive movement for external use.

21. The drive device as set forth in claim 18, wherein the connecting yoke is so resiliently elastic in its stroke direction that slight relative movements of the stroke units are rendered possible.

22. The drive device as set forth in claim 1, adapted for use as a drive for a valve serving for the control of fluid medium.

\* \* \* \* \*